United States Patent
Iyer et al.

(10) Patent No.: US 9,834,164 B1
(45) Date of Patent: Dec. 5, 2017

(54) IMPACT SENSOR ARRANGEMENTS FOR ACTIVE HOOD SYSTEMS OF MOTOR VEHICLES

(71) Applicant: GM GLOBAL TECHNOLOGY OPERATIONS LLC, Detroit, MI (US)

(72) Inventors: Vijay S. Iyer, Bangalore (IN); Andrew Dwoinen, Rochester Hills, MI (US); Rajendra Prasad H. Krishnappa, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/220,662

(22) Filed: Jul. 27, 2016

(51) Int. Cl.
| | |
|---|---|
| *B60R 21/0136* | (2006.01) |
| *B60R 19/48* | (2006.01) |
| *F16F 9/30* | (2006.01) |
| *F16F 9/10* | (2006.01) |
| *F16F 9/32* | (2006.01) |
| *B60R 21/38* | (2011.01) |

(52) U.S. Cl.
CPC ........ *B60R 21/0136* (2013.01); *B60R 19/483* (2013.01); *B60R 21/38* (2013.01); *F16F 9/10* (2013.01); *F16F 9/306* (2013.01); *F16F 9/3207* (2013.01); *F16F 9/3292* (2013.01)

(58) Field of Classification Search
CPC ... B60R 21/0136; B60R 19/483; B60R 21/38; F16F 9/10; F16F 9/3207; F16F 9/306; F16F 9/3292
See application file for complete search history.

(56) References Cited

U.S. PATENT DOCUMENTS

| | | | | |
|---|---|---|---|---|
| 3,859,482 A | * | 1/1975 | Matsui | B60R 21/013 200/61.08 |
| 6,561,301 B1 | * | 5/2003 | Hayashi | B60R 21/0136 180/274 |
| 6,607,212 B1 | * | 8/2003 | Reimer | B60R 21/0136 180/274 |
| 7,104,354 B2 | * | 9/2006 | Ozaki | B60R 21/0136 180/282 |
| 8,196,507 B2 | | 6/2012 | Schafer et al. | |
| 8,596,180 B2 | | 12/2013 | Schaefer et al. | |

(Continued)

FOREIGN PATENT DOCUMENTS

DE 102015210191 A1 * 1/2016

*Primary Examiner* — Drew J Brown
(74) *Attorney, Agent, or Firm* — Quinn IP Law

(57) ABSTRACT

Disclosed are impact sensor arrangements for active hood systems, methods for making and for using such impact sensor arrangements, and motor vehicles with active hood systems using such impact sensor arrangements. Disclosed, for example, is an impact sensor arrangement for an active hood system of a motor vehicle. An active hood system actuator is selectively actuable to displace the vehicle's engine hood. The impact sensor arrangement includes a sensor connected to a sensing tube to detect a characteristic change of the sensing tube and responsively output an actuator trigger signal. First and second blocks, each formed from a high-density material, attach to the vehicle body adjacent the bumper and collectively define an internal channel within which is nested the sensing tube. The first block is movably attached to the second block such that displacement of one block with respect to the other initiates the characteristic change of the sensing tube.

20 Claims, 2 Drawing Sheets

(56) References Cited

U.S. PATENT DOCUMENTS

| | | | |
|---|---|---|---|
| 8,656,716 B2 | 2/2014 | Schafer | |
| 9,487,173 B2* | 11/2016 | Nickel | B60R 13/04 |
| 2005/0193830 A1* | 9/2005 | Suzuki | G01G 3/125 |
| | | | 73/800 |
| 2005/0200139 A1* | 9/2005 | Suzuki | B60R 21/0136 |
| | | | 293/117 |
| 2007/0090931 A1* | 4/2007 | Hawes | B60R 21/0136 |
| | | | 340/436 |
| 2007/0114803 A1* | 5/2007 | Takahashi | B60R 19/483 |
| | | | 293/102 |
| 2007/0132565 A1* | 6/2007 | Tanabe | B60R 21/0136 |
| | | | 340/436 |
| 2008/0203742 A1* | 8/2008 | Takahashi | B60R 19/483 |
| | | | 293/117 |
| 2009/0019940 A1* | 1/2009 | Suzuki | B60R 19/483 |
| | | | 73/800 |
| 2009/0024323 A1* | 1/2009 | Tanabe | B60R 21/0136 |
| | | | 701/301 |
| 2009/0217809 A1 | 9/2009 | Schafer et al. | |
| 2010/0038922 A1* | 2/2010 | Takahashi | B60R 19/483 |
| | | | 293/117 |
| 2010/0089048 A1 | 4/2010 | Schaefer | |
| 2012/0204562 A1 | 8/2012 | Schafer et al. | |
| 2014/0265445 A1* | 9/2014 | Leach | B60R 21/0136 |
| | | | 296/187.04 |
| 2015/0274119 A1* | 10/2015 | Schondorf | B60R 19/483 |
| | | | 293/132 |
| 2016/0039376 A1* | 2/2016 | Narita | B60R 19/483 |
| | | | 293/4 |

* cited by examiner

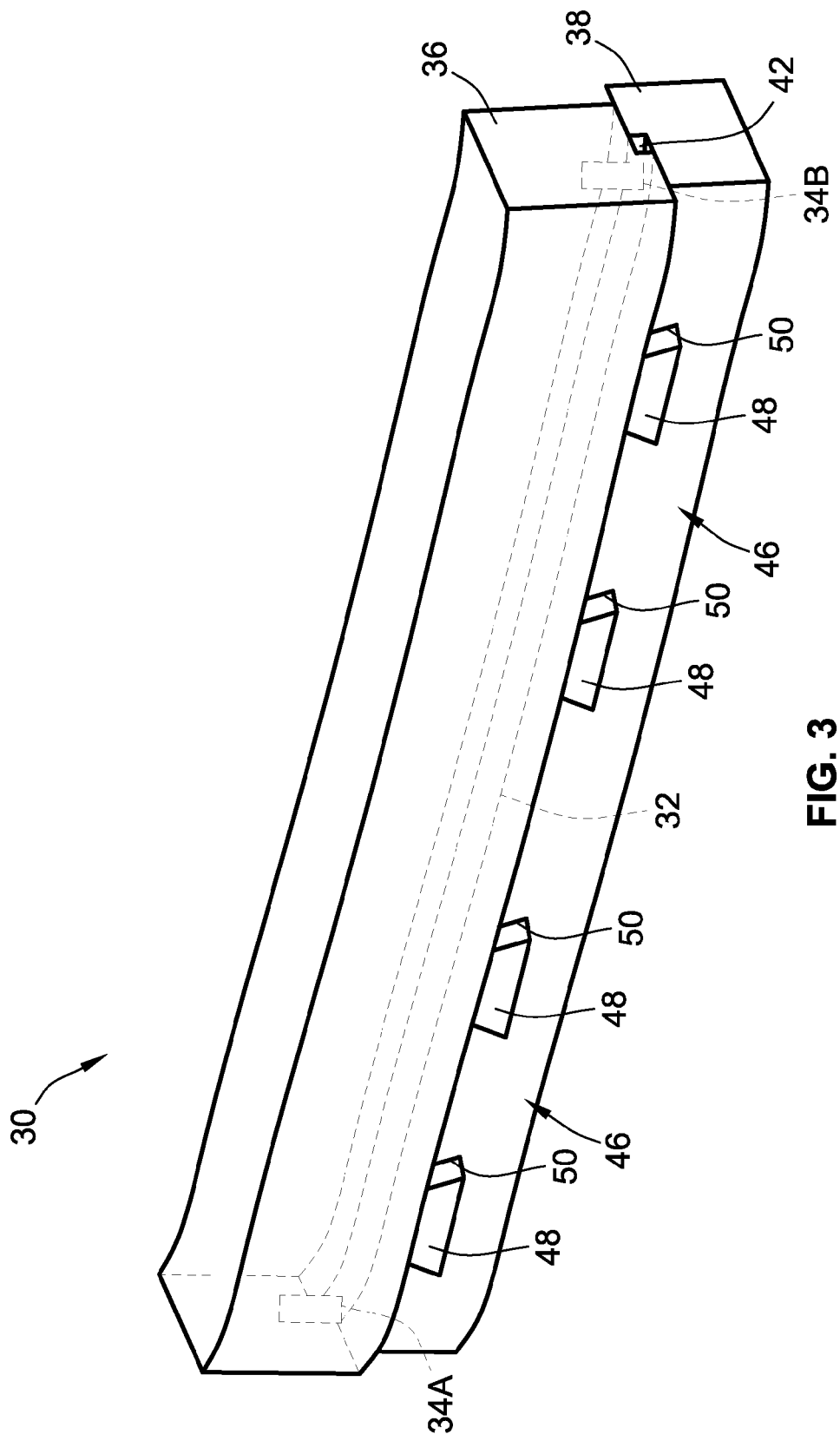

IMPACT SENSOR ARRANGEMENTS FOR ACTIVE HOOD SYSTEMS OF MOTOR VEHICLES

TECHNICAL FIELD

The present disclosure relates generally to active hood systems for motor vehicles. More specifically, aspects of this disclosure relate to impact sensor arrangements for triggering the engine hood lift actuators of an active hood system.

BACKGROUND

Current production motor vehicles, such as the modern-day automobile, are originally equipped with compartment cover assemblies that are movably mounted to the vehicle body to provide access to the vehicle's various compartments. A traditional trunk compartment, for example, is a large storage bin located at the rear of the vehicle and covered by a trunk lid that is hinged underneath the passenger compartment's rear deck. Driver-side and passenger-side vehicle doors, on the other hand, can be opened and closed to allow user access for entering and exiting the passenger compartment. In contrast, the hood (or "bonnet" in some countries) extends over and covers the vehicle's engine compartment to prevent theft and damage of the engine components. On passenger cars, the engine hood is typically hinged to a forward cross-member underneath the dashboard panel or to lateral engine compartment rails of the body in white (BIW), and secured to a front bulkhead cross-member via a releasable latching mechanism.

Engine hoods are typically constructed using stamped metal panels, which combine substantial overall strength and stiffness with a smooth, paintable exterior surface. Hood stiffness is often satisfied via the combination of a relatively high strength stamped metal (outer) fascia panel—often referred to as an "A-surface"—coupled with a preformed inner reinforcement panel—often referred to as a "B-surface"—supported by a series of engine-side hat-section reinforcements. The hat-section reinforcements are typically positioned between the inner and outer panels of the hood, and include a pair of upper flanges oriented toward the A-surface as well as a single lower flange oriented toward the B-surface, with the upper and lower flanges interconnected by a web portion. This conventional hood construction increases the bending stiffness of the engine hood by placing relatively stiff material, usually stamped aluminum or steel, away from the neutral axis of bending of the hood.

In certain vehicle impact scenarios, an object may exert a downward force on the hood; engine hoods are typically designed to deform when a downward force is exerted thereto. However, the deformability of the hood and, correspondingly, the hood's ability to absorb energy may be impeded by the proximity of the hood to rigidly mounted components housed in the vehicle's engine compartment. By way of example, the hood's ability to absorb energy through deformation can be significantly impeded where the hood and engine block are in close proximity. However, minimal clearance between the hood and the engine compartment components may provide significant benefits, such as improved driver visibility, increased aerodynamics, and desired aesthetic appeal. In contrast, additional clearance between the vehicle hood and engine compartment can increase the hood's ability to absorb energy when acted upon with a downward force.

To maintain a low hood line during vehicle operation yet achieve greater clearance between the hood and the engine bay contents during an impact event, many vehicles are provided with an active hood system (referred to colloquially as a "pop-up hood") that is operable to change the orientation and/or position of the hood with respect to the engine prior to deformation of the hood. As an active vehicle system, the engine hood, in response to an impact event, is automatically tilted, raised or otherwise displaced away from the engine by means of spring-loaded or pyrotechnic actuators. These actuators are activated by an impact-detecting sensor arrangement that is packaged at the front end of the vehicle, normally between the outer bumper fascia and the inner bumper crossbeam. The impact-detecting sensor arrangement may include a pair of pressure sensors connected to opposing ends of an air tube that is packaged behind a crushable foam block. The pressure sensors output a trigger signal when the air tube is compressed by a crushing force delivered to the foam block through the bumper fascia at the time of impact. Sensor signals can provide various types of impact information, such as impact type, impact angle, and severity of impact, to an onboard electronic control unit (ECU). Using this information, the ECU employs stored impact algorithms to determine if the impact event meets threshold criteria for deployment; if so, the ECU responsively triggers firing circuits to activate the actuators and thereby deploy the engine hood.

SUMMARY

Disclosed herein are impact sensor arrangements for active hood systems of motor vehicles, methods for making and methods for using such impact sensor arrangements, and motor vehicles with an active hood system using a sliding-block impact sensor arrangement. By way of example, and not limitation, a novel front bumper impact sensor arrangement for an active hood system is disclosed. For this arrangement, a pair of high-density energy-absorbing foam blocks enclose a compressible sensing tube, which may be in the nature of an air tube, a fiber optic tube, an active material tube, etc. Attached at either or both opposing ends of the sensing tube is/are sensors operable to detect a physical, chemical or biological change to the sensing tube. With this arrangement, the sensing tube is deformed due to displacement, rather than compression, of the foam blocks in response to impact forces transmitted through the bumper fascia structure to one or both blocks. The foam blocks can be attached together through a tongue-and-groove joint, a dovetail joint, or any other relevant joinery techniques that enables sliding during displacement of the foam blocks. The shape, size, density and/or relative positioning of the blocks can be selectively modified, for example, to meet disparate design parameters of different intended applications of the active hood system.

Attendant benefits for at least some of the disclosed concepts include the ability to use high-density foam for front bumper sensing applications, which helps to balance active hood sensing performance with low-speed bumper impact load cases. By way of non-limiting example, the sliding high-density foam arrangement helps to ensure proper actuator timing by reducing onset delays inherent with crushable foam, while minimizing false positives and eliminating the need to replace low-density foam blocks crushed by a low-speed impact event. In addition, disclosed impact sensor arrangements can be readily modified with various shapes, sizes, and densities to meet a wide range of performance objectives, e.g., for different vehicle types, different packaging constraints, or different impact performance standards. Sensing tube packaging is simplified as the tube can be enclosed between the sliding foam blocks thereby eliminating the need for fabricating a tube slot in one or both blocks. Assembly of the impact sensor arrangement is also simplified by eliminating the need for a backing plate, adhesives or mounting hardware (e.g., brackets, fasteners, clips, etc.) to attach the sensing tube to the blocks.

Aspects of the present disclosure are directed to front bumper impact sensor configurations for active hood systems. Disclosed, for example, is an impact sensor arrangement for an active hood system of a motor vehicle. The motor vehicle includes a front bumper and a hood attached to the motor vehicle's body. The active hood system includes one or more actuators that are attached to the vehicle body and selectively actuable to displace the hood (e.g., in an upward direction away from the engine block). The impact sensor arrangement includes a sensing tube and a sensor connected to the sensing tube. The sensor is configured to detect a characteristic change of the sensing tube, and to responsively output a signal to thereby trigger the actuator. First and second blocks, each of which is formed from a high-density material, are configured to attach to the vehicle body adjacent the front bumper. The two blocks collectively define an internal channel within which is nested the sensing tube. The first and second blocks are movably attached such that displacement of the first block with respect to the second block initiates the characteristic change of the sensing tube for triggering the actuator(s).

Other aspects of the present disclosure are directed to motor vehicles with active hood systems. A "motor vehicle," as used herein, may include any relevant vehicle platform, such as passenger vehicles (internal combustion engine (ICE), hybrid, electric, fuel cell, etc.), commercial vehicles, industrial vehicles, all-terrain vehicles (ATV), etc. In one example, a motor vehicle is disclosed that includes a vehicle body with an engine compartment within which is mounted an engine, and an energy-absorbing bumper crossbeam that is forward of the engine compartment extending transversely across the front of the vehicle. An engine hood, which is pivotably attached to the vehicle body, covers the engine compartment. In the same vein, a bumper fascia, which is also attached to the vehicle body, covers and conceals the bumper crossbeam.

The motor vehicle of this example also includes an active hood system with one or more pyrotechnic actuators that is/are attached to the vehicle body and selectively actuable to lift or otherwise displace the hood away from the engine compartment. The active hood system also includes a compressible fluid-filled sensing tube, and a pair of pressure sensors each connected to a respective opposing end of the sensing tube. The pressure sensors are operable to detect a fluid pressure change in the sensing tube, and to responsively output a signal indicative thereof to an onboard electronic control unit (ECU) to thereby trigger the pyrotechnic actuator(s). First and second high-density foam/molded polymer blocks are attached to the vehicle body, disposed between the bumper fascia and the bumper crossbeam. These blocks collectively define an internal channel within which is nested the sensing tube. The first block is slidably coupled to the second foam block (e.g., via a sliding dovetail joint) such that rectilinear rearward displacement of the first block with respect to the second block compresses the sensing tube and thereby initiates the fluid pressure change in the sensing tube.

According to other aspects of the present disclosure, methods of making and methods of using impact sensor arrangement are presented. Disclosed, for example, is a method of constructing an impact sensor arrangement for an active hood system of a motor vehicle. The method includes, in any order and in any combination with fewer or additional steps: receiving a sensing tube; connecting a sensor to the sensing tube, the sensor being configured to detect a characteristic change of the sensing tube and responsively output a signal to thereby trigger an actuator of the active hood system; and, nesting the sensing tube within an internal channel collectively defined between first and second blocks each formed from a high-density material, the first and second blocks being configured to attach to the motor vehicle's body adjacent the front bumper, wherein the first block is movably attached to the second block such that displacement of the first block with respect to the second block initiates the characteristic change of the sensing tube. In some embodiments, the internal channel extends lengthwise with respect to the first and second blocks such that the sensing tube is sandwiched therebetween. The method may also include forming the first block from a first high-density foam and forming the second block from a second high-density foam different from the first high-density foam.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a front perspective-view illustration of the impact sensor arrangement of FIG. 2.

Figure 1:
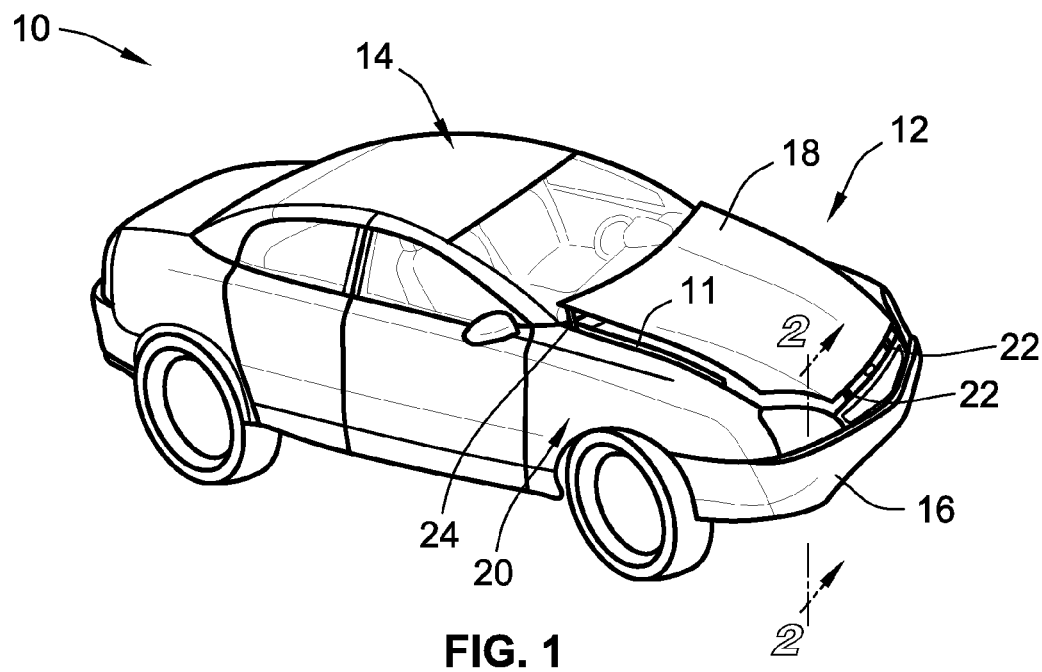
FIG. 1 is an elevated perspective-view illustration of a representative motor vehicle with an active hood system in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a representative automobile—portrayed as a standard four-door coupe and designated generally at 10—that is illustrated in accordance with aspects of the present disclosure. Mounted at a forward portion of the automobile 10, e.g., forward of a passenger compartment 14 and aft of a front bumper fascia 16, is an active hood system 12 with a displaceable hood 18 that extends across and covers a forward vehicle compartment 20. The illustrated automobile 10—also referred to herein as "motor vehicle" or "vehicle" for short—is merely an exemplary application with which the novel aspects of this disclosure can be practiced. In the same vein, the implementation of the present concepts into an active hood system utilizing pyrotechnic actuators and fluid-pressure based sensing should also be appreciated as an exemplary application of the novel concepts disclosed herein. As such, it will be understood that the novel aspects and features of the present disclosure can be integrated into other types of active hood systems and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 an example of a compartment-covering hood 18, represented herein as an engine hood or "bonnet" that is pivotably hinged along lateral edges thereof to left-hand and right-hand engine compartment rails 11 (only the left-hand rail is visible in FIG. 1; however, a mirrored counterpart is similarly positioned on the right-hand (driver) side of the vehicle 10). The hood 18 is secured closed along a front edge thereof by a releasable hood latch (not shown) to ensure that the hood 18 remains shut during vehicle operation. A hood latch handle or latch-release button, which may be located inside the passenger compartment 14, e.g., underneath the steering column or adjacent the driver seat frame, is activated to apply a tensile force to a hood release cable. The loaded hood release cable, which may be of the Bowden cable type, activates a spring-biased hood latch assembly at the distal end of the engine hood assembly 18 opposite the hinge mount. This allows the engine hood assembly 18 to be moved to an open position, e.g., under the biasing force of one or more air cylinders. It should be appreciated that the vehicle hood 18 can take on other forms, such as "flipfront" hoods and "winged" hoods, and can utilize alternative mounting and latching mechanisms. Stowed within the engine compartment 20 are any now known or hereinafter developed components of a prime mover for propelling the vehicle 10, such as an internal combustion engine (ICE), fuse block, battery, ignition coil, windshield washer fluid tank, power steering fluid reservoir, alternator, etc. Alternatively, for motor vehicles with a mid-engine or a rear-engine layout, the forward compartment 20 may function as the vehicle's trunk compartment.

To provide additional clearance between the hood 18 and contents of the engine compartment 20 during an impact event, forward and rearward active hood lift actuators 22 and 24, respectively, arranged adjacent the front as well as rear frame of the hood 18, are selectively actuable to rapidly displace the hood 18 (e.g., within about 15 to 30 milliseconds) to an elevated position, as seen in FIG. 1. It may be desirable, in at least some embodiments, to integrate the actuators 22, 24 into the forward latching mechanism and rear hinges, respectively, of the hood assembly 18. That way, during an impact event, select parts of the hinges and latching mechanism are lifted together with the hood 18 and do not have to be broken in order to enable vertical displacement of the hood. These actuators 22, 24 may take on various forms, including mechanical, spring-operated actuators, as well as pneumatic, pyrotechnically-operated actuators. As per the latter, each actuator 22, 24 may comprise a piston and cylinder arrangement, with a gas generator fluidly coupled to an expandable fluid volume defined between the piston head and the opposing walls of the cylinder's internal chamber. In response to a firing command signal received from an onboard vehicle electronic control unit (ECU) 26 (FIG. 2), the gas generator ignites a stowed combustible gas to rapidly fill the cylinder's expandable fluid volume with compressed gas. This compressed gas, in turn, forces the piston to translate in a generally vertical direction to thereby raise the hood 18. It is envisioned that the active hood system 12 utilize greater or fewer than four pneumatic actuators. Moreover, the actuators may take on alternative locations, orientations and/or actuator type than that which is illustrated in the drawings.

Figure 2:
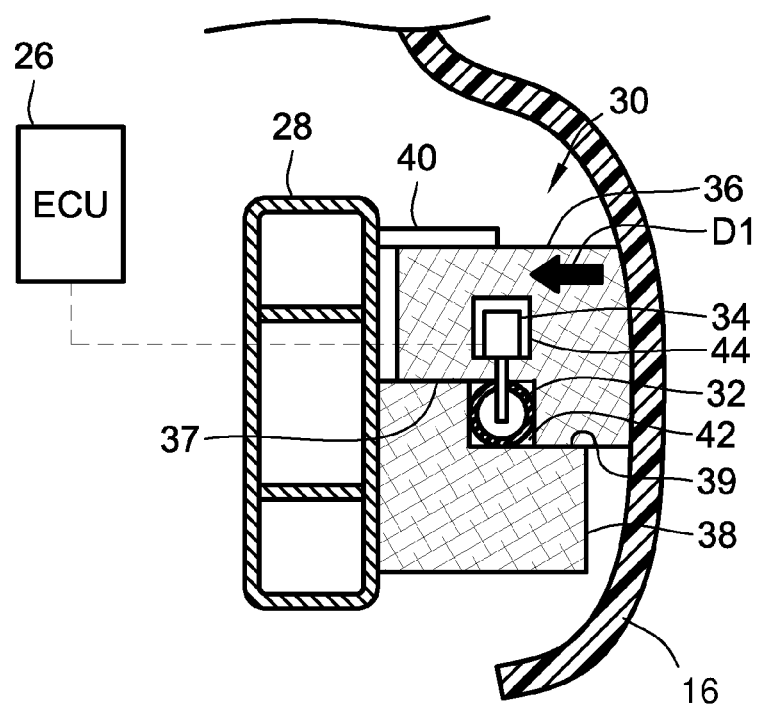
FIG. 2 is a side-view illustration of the front bumper assembly of the motor vehicle of FIG. 1, taken in cross-section along line 2-2 to show an impact sensor arrangement in accordance with aspects of the present disclosure.

Referring next to FIG. 2, there is shown an impact sensor arrangement 30 for detecting the onset of an impact event between an external object, such as the lower appendages of a pedestrian, and the front bumper assembly of the vehicle 10, which is generally composed of a bumper fascia 16 attached to the vehicle body and covering an energy-absorbing bumper crossbeam 28. The front bumper fascia 16 is relatively thin, typically fabricated from fiber-reinforced plastics, hydroformed thermoset polymers, or stamped metallic materials, and designed to provide an aerodynamic contour and to improve the appearance of the underlying bumper components. In contrast, the bumper crossbeam 28 is typically formed from an extruded metal, such as extruded aluminum or steel, and designed to absorb kinetic energy when the motor vehicle 10 experiences a frontal impact event. It may be desirable, for at least some embodiments, that the impact sensor arrangement 30 extend transversely across the front of the vehicle 10, spanning the entire length or substantially the entire length of the bumper assembly 14, 28.

The impact sensor arrangement 30 of FIG. 2 includes an elongated and compressible sensing tube 32 that is connected to one or more sensing device 34, all of which may be stowed within the bumper assembly sandwiched between the bumper fascia 16 and bumper crossbeam 28. While not per se required, some embodiments comprise a pair of pressure sensors 34A and 34B, each of which is fluidly connected to a respective opposing end of a fluid-containing sensing tube 32, as seen in FIG. 3. Optional alternative configurations can use a fiber optic sensing tube optically coupled to one or more photosensors, a smart-material (piezoelectric) based sensing tube electrically coupled to a microcontroller, or any other sensor arrangement wherein compression, tension and/or bending of a sensing tube generates a quantifiable characteristic change that can be detected by a sensing device. The sensor 34 (or sensors 34A, 34B) detects a characteristic change of the sensing tube 32, such as changes in fluid pressure of air or other gaseous medium inside the tube, and responsively outputs a signal to the onboard vehicle ECU 26. The ECU 26 receives a signal or signals from the sensor arrangement 30 indicating that an impact event has occurred as determined by the amount of pressure change in the impact sensing tube 32; the ECU 26 effects lifting of the hood 18 by transmitting a trigger signal to the pyrotechnic actuators 22, 24.

Embedded within the vehicle 10, encased by the front bumper fascia 16 and bumper crossbeam 28, is a pair of energy-absorbing blocks, namely a first (upper) block 36 situated on top of a second (lower) block 38. The pair of energy-absorbing blocks 36, 38 is mounted to the vehicle body, e.g., via one or more clips 40 for attaching the impact sensor arrangement 30 to the bumper fascia 16 and/or bumper crossbeam 28. The blocks 36, 38 may be fabricated from a variety of different materials; however, in the illustrated example, each block 36, 38 is formed from a high-density, impact-resistant foam, such as Ethylene-Ether foam, or molded polymerized material, such as expanded polypropylene (EPP). By way of example, and not limitation, the high-density material may have a density of about 4.0 pounds per cubic foot (lb/ft$^3$) to about 8 lb/ft$^3$. In some configurations, the first block 36 is formed from one type of (first) high-density foam with a distinct (first) density (e.g., approximately 4.2 to 4.5 lb/ft), whereas the second block 38 is formed from a different (second) type of high-density foam with a distinct (second) density (e.g., approximately 7.3 to 7.6 lb/ft$^3$). Alternatively, one or both blocks can be fabricated from other energy absorbing materials, such as a thermoplastic or blow molded polymer.

With reference to both FIGS. 2 and 3, the first and second blocks 36, 38 collectively define an elongated internal channel 42 within which is nested the sensing tube 32. By way of non-limiting example, as seen in FIG. 3, each block 36, 38 has an elongated body with slightly curved opposing ends and a transverse cross-section with a closed polygonal (rectangular) shape. When the upper block 36 is seated on the lower block 38, complementary stepped regions 37 and 39 in opposing lower and upper faces, respectively, of the blocks 36, 38 cooperatively fashion an internal channel 42 that extends lengthwise with respect to the two blocks 36, 38 such that the sensing tube 32 is sandwiched therebetween. Recognizably, the shape, layout and dimensions of the internal channel 42 can be varied, individually or collectively, to accommodate other sensor architectures. Optionally, one or both of the blocks 36, 38 defines a sensor pocket 44 (FIG. 2) within which can be securely nested a respective sensor 34. With the proposed block configuration illustrated in FIGS. 2 and 3, the impact sensor arrangement 30 eliminates conventional backing plates, mounting fasteners and adhesives for coupling the sensing tube 32 to the first and second blocks 36, 38.

The first and second foam blocks 36, 38 are movably interconnected such that displacement of one block with respect to the other initiates a sensor-detectable characteristic change in the sensing tube 32. According to the example illustrated in FIGS. 2 and 3, the first block 36 is slidably coupled to the second block 38, e.g., via a sliding dovetail joint 46, such that the first block displaces in a rearward direction D1 (FIG. 2) along a generally rectilinear path. The illustrated dovetail joint 46 is comprised of a series of transversely spaced, tapered ("tenon") projections 48 that project from the bottom surface of the upper block 36 and slidably telescope into corresponding triangular ("mortis") slots 50 formed along the upper surface of the lower block 38. It is envisioned that the impact sensor arrangement 30 employ other joinery techniques, including finger joints, tongue-and-groove joints, splice joints, etc., as well as attachable sliding devices, such as roller-and-rail slides, linear ball-bearing slides, etc., to slidably attach one block to the other. As another option, the impact sensor arrangement 30 may be configured such that the blocks 36, 38 are pivotably coupled such that one/both blocks rotate into engagement with the other to effectuate the proposed functionality thereof. In an impact event, impact forces are transferred through the front bumper fascia 16 to the forward surface of the upper block 36; the upper block 36, in turn, is pushed rearward toward bumper crossbeam 28 crushing or otherwise compressing the sensing tube 32 between the two blocks 36, 38. By this compressive force, one part of the sensing tube 32 receives a pressure wave caused by the impact. This pressure wave causes a demonstrable spike in air pressure within the sensing tube 32, which is detected by the sensor(s) 34. The sensor(s) 34 responsively output an electrical signal indicative thereof to the ECU 26 to thereby trigger the actuators 22, 24.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An impact sensor arrangement for an active hood system of a motor vehicle, the motor vehicle including a vehicle body with a front bumper and a hood attached to the vehicle body, the active hood system including an actuator attached to the vehicle body and selectively actuable to displace the hood, the impact sensor arrangement comprising:
   a sensing tube;
   a sensor connected to the sensing tube and configured to detect a characteristic change of the sensing tube and responsively output a signal to thereby trigger the actuator; and
   first and second blocks each formed from a high-density material and configured to attach to the vehicle body adjacent the front bumper, the first and second blocks collectively defining an internal channel within which is nested the sensing tube,
   wherein the first block is slidably coupled via a sliding dovetail joint to the second block to displace along a rectilinear path such that displacement of the first block with respect to the second block initiates the characteristic change of the sensing tube.

2. The impact sensor arrangement of claim 1, wherein the first block is formed from a first high-density foam and the second block is formed from a second high-density foam different from the first high-density foam.

3. The impact sensor arrangement of claim 2, wherein the first high-density foam has a first density and the second high-density foam has a second density greater than the first density.

4. The impact sensor arrangement of claim 1, wherein the high-density material has a density of about 4 pounds per cubic foot (lb/ft³) to about 8 lb/ft³.

5. The impact sensor arrangement of claim 1, wherein the first and second blocks each has an elongated body with a transverse cross-section having a polygonal shape.

6. The impact sensor arrangement of claim 1, wherein the front bumper includes a bumper fascia and a bumper crossbeam, and wherein the first block and the second block are configured to sandwich between the bumper fascia and the bumper crossbeam.

7. The impact sensor arrangement of claim 1, wherein the sliding dovetail joint includes a tapered projection that projects from one of the first and second blocks, and a triangular slot formed in the other of the first and second blocks, the tapered projection being slidably seated within the triangular slot.

8. The impact sensor arrangement of claim 1, wherein the first block or the second block, or both, defines a sensor pocket within which is nested the sensor.

9. The impact sensor arrangement of claim 1, wherein the sensing tube contains a fluid, and wherein the sensor is configured to detect a fluid pressure change in the sensing tube.

10. The impact sensor arrangement of claim 9, wherein the sensor includes a pair of pressure sensors each connected to a respective opposing end of the sensing tube.

11. The impact sensor arrangement of claim 1, further comprising one or more clips configured to mount the first and second blocks to the vehicle body within the front bumper.

12. The impact sensor arrangement of claim 1, wherein each of the first and second blocks has an elongated body, and wherein the internal channel extends lengthwise with respect to the first and second blocks such that the sensing tube is sandwiched therebetween.

13. The impact sensor arrangement of claim 1, characterized by a lack of a backing plate or a mounting fastener coupling the sensing tube to the first and second blocks.

14. A motor vehicle, comprising:
a vehicle body with an engine compartment and a bumper crossbeam forward of the engine compartment;
an engine hood pivotably attached to the vehicle body adjacent the engine compartment;
a bumper fascia attached to the vehicle body adjacent the bumper crossbeam;
an electronic control unit (ECU); and
an active hood system comprising:
an actuator attached to the vehicle body and selectively actuable to displace the engine hood away from the engine compartment;
a compressible sensing tube;
a sensor connected to the sensing tube, the sensor being configured to detect a characteristic change in the sensing tube and output a signal indicative thereof to the ECU to thereby trigger the actuator; and
first and second high-density foam blocks attached to the vehicle body, disposed between the bumper fascia and the bumper crossbeam, the first and second foam blocks collectively defining an internal channel within which is nested the sensing tube, wherein the first foam block is slidably coupled to the second foam block via a sliding dovetail joint such that rectilinear rearward displacement of the first block with respect to the second block compresses the sensing tube and thereby initiates the characteristic change in the sensing tube.

15. A method of constructing an impact sensor arrangement for an active hood system of a motor vehicle, the motor vehicle including a vehicle body with a bumper and a hood attached to the vehicle body, and the active hood system including an actuator attached to the vehicle body and selectively actuable to displace the hood, the method comprising:
receiving a sensing tube;
connecting a sensor to the sensing tube, the sensor being configured to detect a characteristic change of the sensing tube and responsively output a signal to thereby trigger the actuator; and
nesting the sensing tube within an internal channel collectively defined by first and second blocks each formed from a high-density material, the first and second blocks being configured to attach to the vehicle body adjacent the bumper, wherein the first block is movably attached to the second block via a sliding dovetail joint such that displacement of the first block with respect to the second block initiates the characteristic change of the sensing tube.

16. The method of claim 15, wherein the first block is formed from a first high-density foam and the second block is formed from a second high-density foam different from the first high-density foam.

17. The method of claim 15, wherein the high-density material has a density of about 4 pounds per cubic foot (lb/ft³) to about 8 lb/ft³.

18. The method of claim 15, wherein the first and second blocks each has an elongated body with a transverse cross-section having a polygonal shape.

19. The method of claim 15, wherein the first block is slidably coupled to the second block to displace along a rectilinear path.

20. The method of claim 15, wherein each of the first and second blocks has an elongated body, and wherein the internal channel extends lengthwise with respect to the first and second blocks such that the sensing tube is sandwiched therebetween.

* * * * *